United States Patent [19]

Chappelle

[11] 4,097,840
[45] Jun. 27, 1978

[54] AUTOMATIC SEMI-TRAILER LANDING GEAR EXTENSION AND RETRACTION APPARATUS

[76] Inventor: Warner A. Chappelle, 4801 NW. 69th, Oklahoma City, Okla. 73132

[21] Appl. No.: 733,230

[22] Filed: Oct. 18, 1976

[51] Int. Cl.² .............................................. B60Q 1/00
[52] U.S. Cl. .............................. 340/52 R; 280/423 A
[58] Field of Search ................... 340/27 R, 52 R, 53; 200/47, 61.44; 280/425 R, 427, 421, 422, 423 R, 423 A

[56] References Cited

U.S. PATENT DOCUMENTS 3,628,811  12/1971  Rivers .............................. 280/421

Primary Examiner—Alvin H. Waring
Attorney, Agent, or Firm—Robert M. Hessin

[57] ABSTRACT

An improved apparatus for automatically extending and retracting the landing gear of a semi-trailer. The apparatus includes a reversible electric motor and speed reducer removably drivingly securable to an existing manually operated mechanism for extending and retracting a landing gear. Electric circuitry is provided for permitting an operator to control the extension and retraction of the landing gear from within the cab of a tractor and, alternately, from the exterior of the semi-trailer. The electrical circuitry provides both audible and visual indication of the position status of the landing gear and automatic cutoff of the electric motor when the landing gear is fully extended, and alternately, when the landing gear is fully retracted.

29 Claims, 11 Drawing Figures

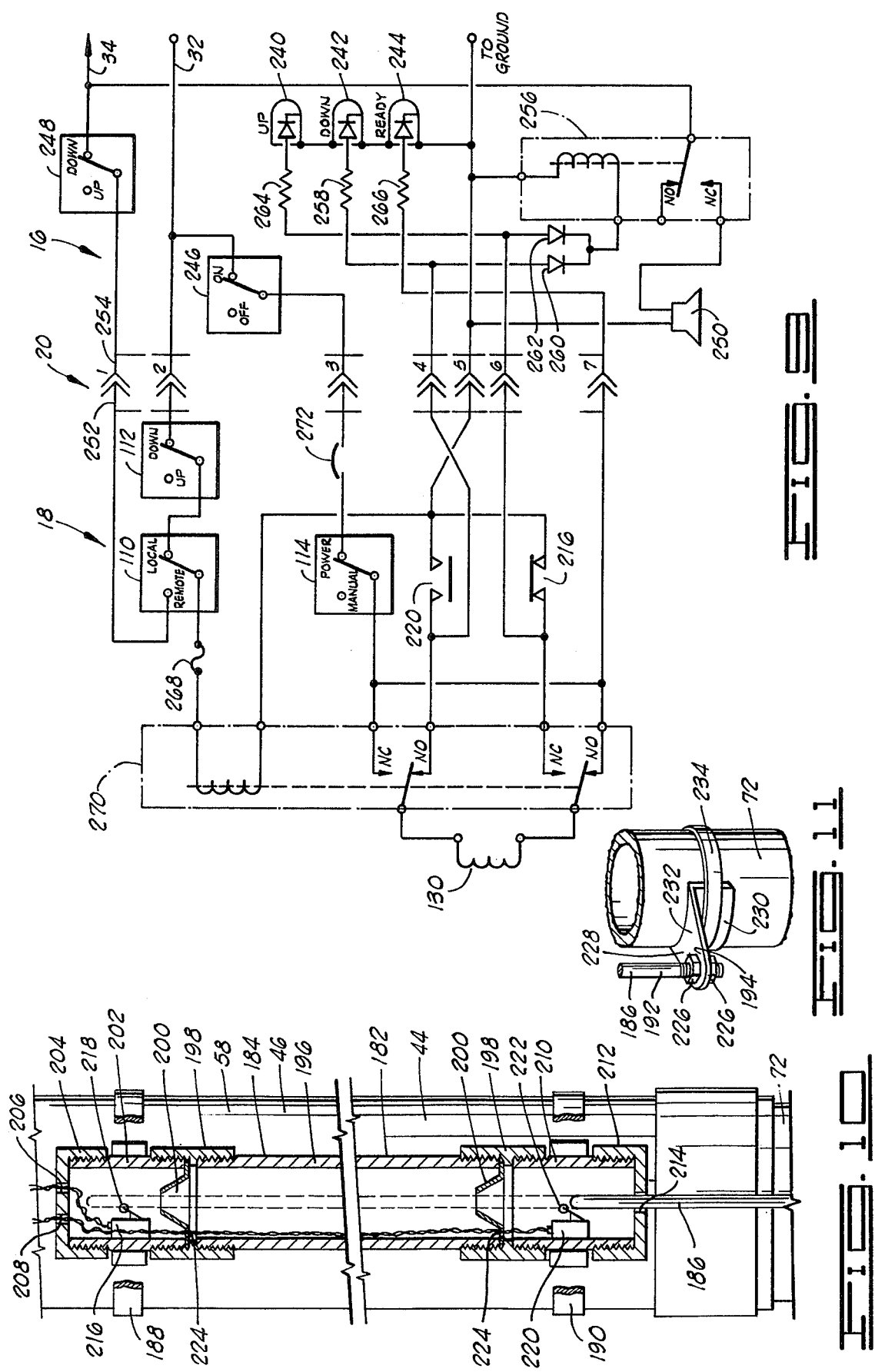

AUTOMATIC SEMI-TRAILER LANDING GEAR EXTENSION AND RETRACTION APPARATUS

BACKGROUND OF THE INVENTION

1. Field of the Invention

This invention relates generally to improvements in semi-trailer landing gear mechanisms, and more particularly, but not by way of limitation, to improved apparatus for automatically extending and retracting a semi-trailer landing gear mechanism.

2. Description of the Prior Art

The prior art contains a number of devices for mechanically or electrically extending and retracting the landing gear of a semi-trailer. Notable among these teachings are U.S. Pat. No. 3,628,811 to Rivers; U.S. Pat. No. 3,402,915 to Dalton; U.S. Pat. No. 3,136,527 to Griffis; U.S. Pat. No. 3,117,762 to Ketel; U.S. Pat. No. 1,970,014 to Molinare; U.S. Pat. No. 2,001,411 to Davis; and U.S. Pat. No. 2,363,851 to Barnhart et al.

The prior art devices are, in general, cumbersome and expensive and generally require installation of such devices on the semi-trailer at the time of installation of the landing gear thereon. Owing primarily to the complexity and expense of the prior art systems, they have not enjoyed widespread acceptance in the trucking industry. Also, the complexity of such systems has rendered them relatively fragile and therefore generally unsuited to the rugged environment to which over-the-road semi-trailers are subjected daily.

SUMMARY OF THE INVENTION

The present invention contemplates an automatic semi-trailer landing gear extension and retraction apparatus suitable for use with a conventional tractor having an operator's cab, a source of electrical power, and a fifth wheel hitch member. The apparatus is also employed in conjunction with a semi-trailer having hitch pin means on the forward end portion for engaging the fifth wheel hitch member of the conventional tractor, road wheels journaled on the rear end portion and an alternately extendable and retractable landing gear mounted intermediate the hitch pin means and the road wheels. Such landing gear is equipped with gear drive means operatively engaged therewith which includes an input drive shaft adapted to be engaged by a crank handle for manual rotation thereof in a first direction to extend the landing gear to engage the ground and support the semi-trailer independently of the tractor and, alternately, in a second direction to retract the landing gear from the ground engaging position to allow the forward end portion of the semi-trailer to be supported by the tractor with the hitch pin means engaging the fifth wheel hitch member.

The improved automatic landing gear extension and retraction apparatus comprises an electric drive motor mounted on the forward end portion of the semi-trailer and having a power output shaft as well as means for drivingly connecting the power output shaft to the input drive shaft of the gear drive means of the landing gear. The apparatus also provides position sensing means operatively connected to the landing gear for providing a first signal input when the landing gear is retracted and, alternately, for providing a second signal input when the landing gear is extended. Additionally, the apparatus is provided with control circuit means mutually interconnecting the source of electrical power, electric drive motor and the position sensing means, and is responsive to external control thereof to thereby provide electrical power to the electric drive motor to rotate the input drive shaft in the first direction to extend the retracted landing gear and, alternately, for providing electrical power to the electric drive motor to rotate the input drive shaft in the second direction to retract the extended landing gear.

It is an object of the present invention to provide increased efficiency to the landing gear apparatus of a semi-trailer.

One advantage of the invention resides in its provision of an apparatus which can be readily installed on the existing landing gear of a semi-trailer to provide automatic extension and retraction thereof while still permitting manual operation if desired.

Another advantage of the invention resides in the provision of automatic controls in both the tractor cab and on the semi-trailer for operating the automatic landing gear extension and retraction apparatus.

An additional advantage of the present invention resides in the provision of visual indicator means within the tractor cab to provide the operator with a clear indication of the exact status of the landing gear during the operation thereof.

Another advantage of the present invention resides in the provision of both a visual and an audible alarm to indicate that the apparatus is activated and that the landing gear is extending and, alternately, retracting.

Still another advantage of the present invention resides in the provision of fail-safe circuitry which requires the energization of a relay in order to extend the landing gear.

A still further advantage of the present invention resides in its flexibility of installation, economy in construction and flexibility, simplicity and safety in operation.

Other objects and advantages of the invention will be evident when the following detailed description is read in conjunction with the accompanying drawings.

BRIEF DESCRIPTION OF THE DRAWINGS

FIG. 9 is an electrical schematic diagram illustrating the control circuit of the improved automatic landing gear extension and retraction apparatus of the present invention.

FIG. 10 is an enlarged fragmentary side elevation view of the position sensing subassembly of the improved automatic landing gear extension and retraction apparatus installed on one leg of the landing gear with the position sensing subassembly shown in substantial vertical cross-section along its longitudinal axis.

FIG. 11 is a perspective view illustrating the details of construction of the interconnection between the position sensing subassembly and the corresponding lower leg of the landing gear.

DESCRIPTION OF A PREFERRED EMBODIMENT

Figure 1:
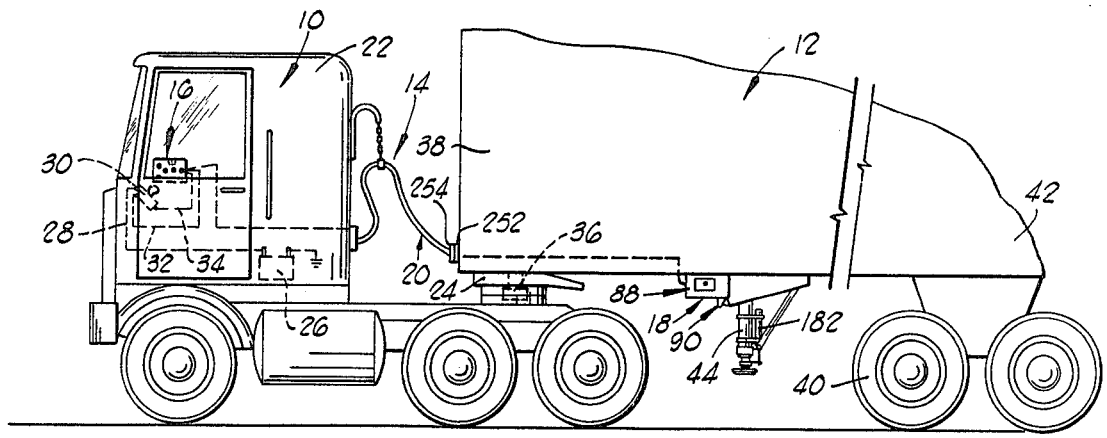
FIG. 1 is a side elevation view illustrating a tractor and the forward end portion of a semi-trailer hitched thereto and showing the installation of the improved automatic landing gear extension and retraction apparatus of the present invention installed thereon.
Figure 2:
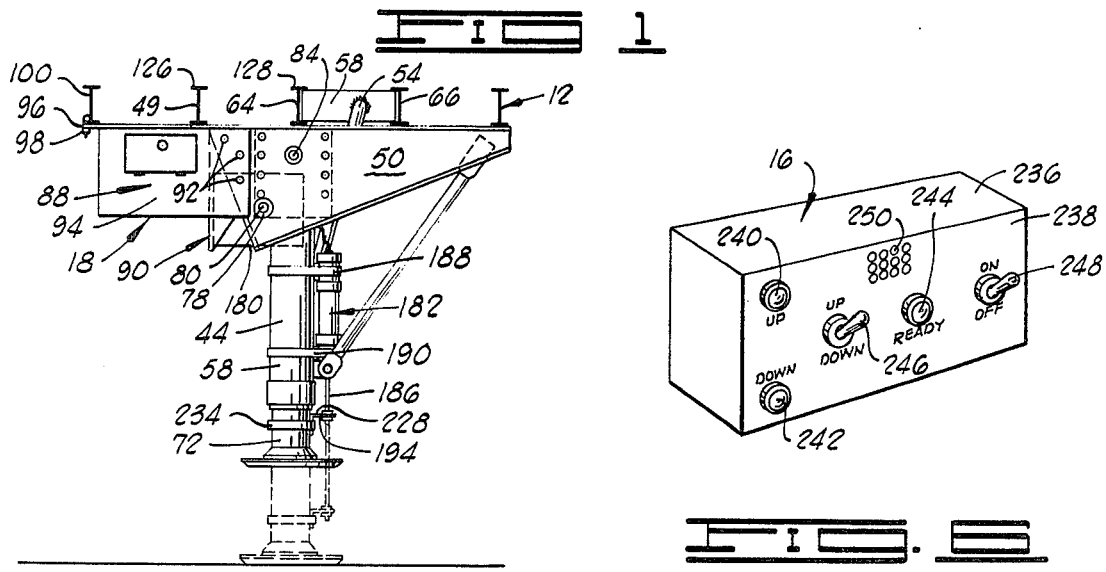
FIG. 2 is an enlarged partial side elevation view illustrating the installation of a portion of the improved automatic landing gear extension and retraction apparatus on the landing gear of the semi-trailer showing the landing gear in the retracted position with the extended position shown in dashed lines.

Referring now to the drawings, an improved automatic landing gear extension and retraction apparatus is shown therein installed on and between a conventional tractor 10 and semi-trailer 12. The landing gear extension and retraction apparatus is generally designated by the reference character 14 and comprises a tractor control unit 16, a semi-trailer control and actuation assembly 18 and a cable assembly 20 interconnecting the tractor control unit 16 and the semi-trailer control and actuation assembly 18.

The tractor 10 is of the type which includes a conventional operator's cab 22, a conventional fifth wheel hitch member 24 and a source of electrical power 26. The source of electrical power 26 suitably comprises one or more electric storage batteries providing a 24 volt direct current potential difference for the operation of the extension and retraction apparatus of the present invention. Conductor 28 provides current from the storage battery 26 to one terminal of the key-operated switch 30 in the cab 22. Conductor 32 provides unswitched electrical power from the storage battery 26 to the tractor control unit 16 while conductor 34 provides switched electrical power from the switch 30 to the tractor control unit 16.

The semi-trailer 12 includes a conventional hitch pin 36 mounted on the forward end portion 38 thereof for securing the semi-trailer to the hitch member 24 of the tractor 10. Conventional road wheels 40 are journaled on the rear end portion 42 of the semi-trailer 12.

An alternately extendable and retractable landing gear 44 is mounted under the forward end portion 38 of the semi-trailer 12 intermediate the hitch pin 36 and the road wheels 40. The landing gear 44 comprises a pair of telescopically related struts 46 and 48 secured respectively to the frame structure 49 of the trailer 12 by means of brackets 50 and 52. Cross braces 54 and 56 extend respectively between the upper legs 58 and 60 of the struts 46 and 48 and a longitudinal angle brace 60 is fixedly secured between adjacent transverse semi-trailer floor joists 64 and 66. Suitable ground engaging members, such as self-leveling shoes 68 and 70, are mounted on the lower ends of the lower legs 72 and 74 of the respective struts 46 and 48.

The lower legs 72 and 74 are extended relative to the upper legs 58 and 60 by means of a gear drive mechanism 76 secured to the upper leg 58. The gear drive mechanism 76 includes an input drive shaft 78 which extends horizontally outwardly from either side thereof. The outer end portion 80 of the drive shaft 78 is ordinarily adapted to receive one end of the hand crank in driving engagement therewith. The inner end portion 82 is adapted to be drivingly engaged by the semi-trailer control and actuator assembly 18 as will be described in detail hereinafter. The output shaft 84 of the gear drive mechanism 76 is drivingly engaged with the lower leg 72 within the upper leg 58 of the strut 46 whereby rotation of the output shaft 84 in a first direction in response to the rotation of the input drive shaft 78 in a corresponding first direction causes the lower leg 72 to extend relative to the upper leg 58 and, alternately, whereby rotation of the output shaft 84 in a second direction in response to rotation of the input drive shaft 78 in a corresponding second direction causes the lower leg 72 to be retracted relative to the upper leg 58. The inner end portion 86 of the output shaft 84 extends across the semi-trailer 12 from the gear drive mechanism 76 and drivingly engages the lower leg 74 within the upper leg 60 of the strut 48. In a manner similar to that described above for the strut 46, rotation of the output shaft 84 in a first direction in response to a corresponding rotation of the input drive shaft 78 in a first direction causes the lower leg 74 to be extended relative to the upper leg 60 and, alternately, rotation of the output shaft 84 in a second direction in response to rotation to the input drive shaft 78 in a corresponding second direction causes retraction of the lower leg 74 relative to the upper leg 60. The interconnection between the struts 46 and 48 via the inner end portion 86 of the output drive shaft 84 of the gear drive mechanism 76 provides synchronized extension and retraction of the struts 46 and 48 in response to corresponding rotation of the input drive shaft 78 in first and second directions, respectively.

Figure 3:
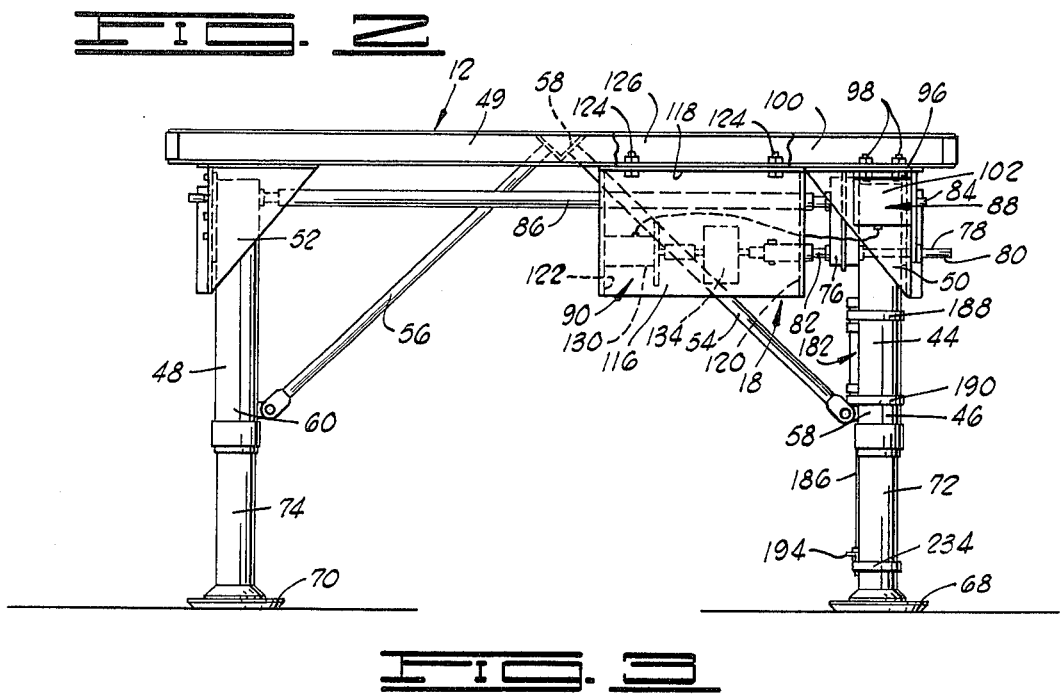
FIG. 3 is an enlarged front elevation view of the portion of the improved automatic landing gear extension and retraction apparatus of FIG. 2 with the landing gear in the extended position.
Figures 4, 5:
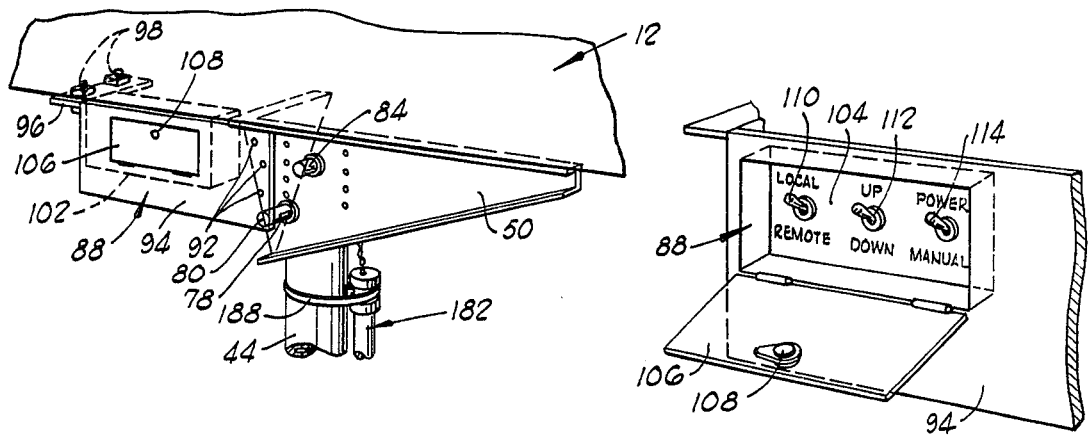
FIG. 4 is an enlarged, partial perspective view illustrating the control subassembly of the improved automatic landing gear extension and retraction apparatus as installed on the semi-trailer.
FIG. 5 is an enlarged partial perspective view of the semi-trailer control subassembly of FIG. 4 illustrating the control switches and locking panel thereof.
Figure 7:
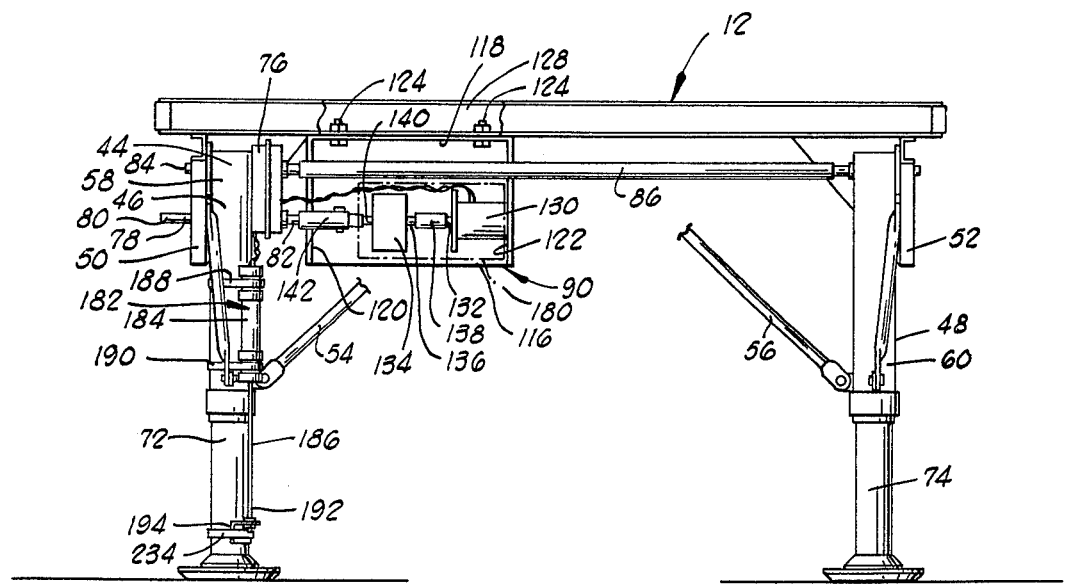
FIG. 7 is an enlarged rear elevation view of the portion of the improved automatic landing gear extension and retraction apparatus of FIG. 2.

The previously described structure of the landing gear 44 is conventional and well known in the trucking industry. The gear drive mechanism 76 provides two choices of speed reduction between rotational speed of the input drive shaft 78 and the output shaft 84 which may be selected by the operator. The gear ratios for the two choices of speed reduction are selected by manually displacing the input drive shaft 78 to the left or to the right within the gear drive mechanism 76 as viewed in FIG. 3. When the input drive shaft 78 is displaced to the left within the gear drive mechanism 76, the selected speed reduction provides twenty-five turns of the input drive shaft 78 per one inch of relative extension or retraction of the lower legs 72 and 74 relative to the upper legs 58 and 60. When the input drive shaft 78 is moved to the right within the gear drive mechanism 76, as viewed in FIG. 3, the speed reduction selected then provides four turns of the input drive shaft 78 per inch of extension or retraction of the lower legs 72 and 74 relative to the upper legs 58 and 60.

The semi-trailer control and actuation assembly 18 provides means for readily converting the manually operated landing gear 44 as described above to an electrically operated landing gear. The assembly 18 comprises a control subassembly 88 and a drive motor subassembly 90. The control subassembly 88 may be suitably mounted to the semi-trailer 12 by means of bolts 92 securing one end of a vertical mounting panel 94 to the bracket 50 of the landing gear 44. A horizontal bracket 96 is fixedly secured to the panel 94 and provides means for attaching the panel 94 to the underside of the semi-trailer 12. The bracket 96 can be suitably secured to the semi-trailer 12 by means of threaded bolts 98 mutually securing the bracket 96 to the flange of a transverse floor joist 100. A closed housing 102 is mounted to the rear of the panel 94 and contains the electrical circuitry associated with the control subassembly 88 which will be described in detail hereinafter. A recessed switch panel 104 is mounted between the panel 94 and the interior of the housing 102 and access to the switch panel 104 is provided by a door 106 hingedly secured to the panel 94. The door 106 is equipped with a conventional key lock mechanism 108 which permits the switch panel 104 to be secured against unauthorized tampering with the switches mounted therein. The switch panel 104 includes three toggle switches 110, 112 and 114 mounted therein. The "local/remote" switch 110 provides a selection between local and remote operation of the extension and retraction apparatus 14. The "up/down" toggle switch 112 provides selection between an "up" mode in which the landing gear is retracted and a "down" mode in which the landing gear is extended. The "power/manual" toggle switch 114 provides means for selecting between manual operation of the landing gear 44 with a hand crank and automatic electrical operation of that mechanism.

The drive motor subassembly 90 comprises a vertical motor mounting plate 116 fixedly secured along its upper edge to a horizontal mounting plate 118. Suitable reinforcing gusset plates 120 and 122 interconnect the plates 116 and 118 to provide a rigid structure. This rigid structure is secured to the underside of the frame structure 49 of the semi-trailer truck 12 by suitable means such as a plurality of threaded bolts 124 securing the horizontal mounting plate 118 to the transverse floor joists 126 and 128.

An electric drive motor 130 is mounted on the rear side of the motor mounting plate 116 with the power output shaft 132 thereof in substantially coaxial alignment with the input drive shaft 78 of the gear drive mechanism 76. The electric drive motor 130 is preferably a reversible D.C. motor of approximately 1/20 horsepower and is electrically connected by suitable wires to the control subassembly 88.

An in-line speed reducer 134 is also mounted on the rear side of the motor mounting plate 116 with the power input shaft 136 thereof coaxially aligned with the power output shaft 132 of the electrical drive motor. A suitable speed reducer is sold under the Dayton brand and provides a 118:1 speed reduction ratio with a nominal output of 15 revolutions per minute. The power input shaft 136 and the power output shaft 132 are suitably drivingly connected by means of a conventional shaft coupling 138. The power output shaft 140 of the speed reducer 134 is substantially coaxially aligned with the input drive shaft 78 of the gear drive mechanism 76. The power output shaft 140 is drivingly secured to the input drive shaft 178 of the gear drive mechanism 76 by means of a suitable shaft coupling 142.

Figure 8:
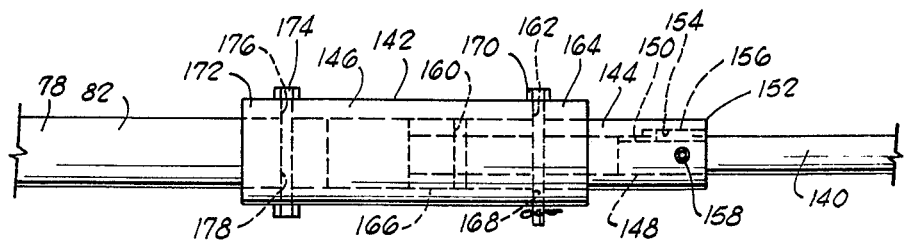
FIG. 8 is an enlarged elevation view of the coupling mechanism between the speed reducer output shaft and the input drive shaft of the gear drive mechanism of the semi-trailer.

Shaft coupling 142 is best shown in FIG. 8 and comprises a pair of concentric tubular drive members 144 and 146, the drive members being sized and shaped such that the drive member 144 is closely concentrically received within the drive member 146. The outer end 148 of the power output shaft 140 includes a longitudinal keyway 150 formed in the cylindrical outer surface thereof, while the first end portion 152 of the drive member 144 includes a corresponding longitudinal keyway 154 formed in the cylindrical inner surface thereof. Driving engagement is achieved between the power output shaft 140 and the drive member 144 by means of a key 156 mutually received within the keyways 150 and 154. Relative longitudinal displacement between the power output shaft 140 and the drive member 144 is achieved by a suitable set screw 158 mutually engaging the power output shaft 140 and the drive member 144.

The second end portion of the drive member 144 includes a pair of longitudinally spaced, transverse apertures 160 and 162 extending therethrough. The longitudinal spacing between the apertures 160 and 162 is substantially equal to the maximum longitudinal displacement of the input drive shaft 178 within the gear drive mechanism 76 when moved between the two selectable speed reduction capacities of the gear drive mechanism 76. The first end portion 164 of the drive member 146 is closely and concentrically received about the second end portion 166 of the drive member 144 and includes a transverse aperture 168 extending therethrough.

A driving connection is achieved between the drive member 144 and the drive member 146 by means of a removable, transverse pin 170 mutually received through the aperture 168 and a selected one of the apertures 160 or 162. As shown in FIG. 8, the pin 170 is received through the apertures 168 and 162, which position corresponds to a positioning of the input drive shaft 78 within the gear drive mechanism 76 achieving the greater of the two selectable speed reductions which results in the extension and retraction of the lower legs 72 and 74 relative to the upper legs 58 and 60 at a rate of one inch per twenty-five turns of the input drive shaft 78. It will be readily apparent that the mutual engagement of the apertures 168 and 160 will achieve an extension and retraction rate of the struts of the landing gear 44 of one inch per four revolutions of the input drive shaft 78.

The second end portion 172 of the drive member 146 is sized to be closely and concentrically received about the cylindrical outer periphery of the inner end portion 82 of the input drive shaft 78. A rigid, driving interconnection is achieved between the drive member 146 and the input drive shaft 78 by means of a transverse drive pin 174 mutually received within corresponding aligned transverse apertures 176 and 178 formed in the drive member 146 and the input drive shaft, respectively. The drive pin 174 may be permanent, or may be removable. It may be advantageous for the drive pin 174 to be in the form of a replaceable shear pin to prevent overloading of the electric drive motor 130 in the event of a jamming malfunction in the landing gear mechanism 44.

The drive motor subassembly 90 further includes a suitable cover 180 mounted on the rear side of the motor mounting plate 116 covering and protecting the drive motor 130 and speed reducer 134 from the introduction of dirt, water, ice, snow and road salt or the like into their mechanisms. The vertical motor mounting plate 116 also provides a high degree of protection to the electric drive motor 130 and speed reducer 134 by shielding these components from stones and other deleterious matter thrown up by the tractor wheels when the tractor and semi-trailer are in operation over the road.

The semi-trailer control and actuation assembly 18 further includes a position sensing subassembly 182 for sensing the relative extension and retraction of the lower legs 72 and 74 relative to the upper legs 58 and 60 of the landing gear 44. The position sensing subassembly 182 comprises a substantially cylindrical housing assembly 184 and a position-responsive rod 186 longitudinally slidably disposed within the housing assembly 184. The position sensing subassembly 182 is preferably mounted on the landing gear strut nearest the control subassembly 88, in this case strut 46. The housing assembly 184 is secured to the upper leg 58 by means of suitable brackets 188 and 190 encompassing the housing assembly 184 and the upper leg 58. The lower end portion 192 of the rod 186 is secured to the lower leg 72 by means of a suitable bracket 194.

Referring now to FIGS. 10 and 11, the position sensing subassembly 182 is illustrated therein in somewhat greater detail. The housing assembly 184 comprises a cylindrical intermediate member 196 having externally threaded upper and lower end portions. An internally threaded tubular coupling 198 is threadedly secured to the upper end portion of the intermediate member 196 with an inwardly extending annular shoulder of the coupling 198 abutting the upper end face of the intermediate member. A substantially funnel-shaped annular guide member 200 is positioned on the upper end face of the annular shoulder in the coupling 198 and is secured thereto by means of a cylindrical upper switch housing member 202 which is threadedly secured to the upper internal threads of the coupling 198. An upper end cap 204 is threadedly secured to the upper end of the upper switch housing member 202 and includes a pair of apertures 206 and 208 through which wires can pass as will be described hereinafter.

A second internally threaded tubular coupling 198 is threadedly secured to the externally threaded lower end portion of the intermediate member 196 with another guide member 200 interposed between the lower end face of the intermediate member 196 and the annular shoulder of the coupling 198. A tubular lower switch housing member 210 is threadedly secured to the lower coupling 198 and extends downwardly therefrom. A lower end cap 212 is threadedly secured to the externally threaded lower end portion of the lower switch housing member 210 and includes an aperture 214 formed in the center thereof through which the rod 186 is slidably received.

A single pole double throw lever switch 216 is fixedly mounted within the upper switch housing member 202. The switch 216 is mounted such that the roller lever 218 thereof is normally biased into the path of the rod 186 as is evidenced by the dashed lines in FIG. 10. The switch 216 is wired such that it is in the normally closed position when the lever 218 is out of contact with the rod 186. Switch 216 is open when the lever 218 is engaged with the rod 186 when the rod is in the position indicated by the dashed lines in FIG. 10.

A second single pole double throw lever switch 220 is fixedly mounted within the lower switch housing member 210. The roller lever 222 of the switch 220 is biased into the path of the rod 186 as evidenced by the dashed lines in FIG. 10. Switch 220 is wired such that it is in the normally open position when the lever 222 is out of contact with the rod 186. Switch 220 is closed when the lever 222 is engaged by the rod 186 when the rod 186 is in the position indicated by the dashed lines in FIG. 10.

The connecting wires from switch 216 preferably pass from the housing assembly 184 through the aperture 206 in the upper end cap 204, while the connecting wires from switch 220 are passed from the housing assembly 164 through the aperture 208. The connecting wires from the switch 220 are directed through apertures 224 formed in each of the guide members 200.

It will be seen in FIG. 10 that the aperture 214 in the lower end cap 212 and the funnel-shaped aperture in each of the annular guide members 200 serve to maintain the rod 186 in longitudinal coaxial alignment within the housing assembly 184 throughout the full range of longitudinal motion of the rod 186 relative to the housing assembly 184.

The lower end portion 192 of the rod 186 is preferably externally threaded and receives a pair of threaded locking nuts 226 thereon. The bracket 194 preferably comprises a substantially L-shaped member 228 comprising a partially cylindrically shaped leg 230 conforming to the exterior surface of the lower leg 172 and an outwardly extending leg 232 having an aperture formed therein through which the lower end portion 192 of the rod 186 is received. The leg 230 of the L-shaped member 228 may be suitably fixedly secured to the lower leg 72 by means of a suitable strap clamp 234 encompassing the leg 230 and the lower leg 72 and mutually securing them together. The lower end portion 192 of the rod 186 is fixedly secured to the leg 232 by means of the threaded nuts 226 disposed on either side of the leg 232. This structure is most clearly illustrated in FIG. 11.

By selecting the proper length of the rod 186 and the intermediate member 196 of the housing assembly 184, the position sensing subassembly 182 can be adapted to operate properly with landing gear structures having various maximum travel distances between fully extended and fully retracted positions. Such travel distances commonly range between twelve and nineteen inches. Precise adjustment of the operating characteristics of the position sensing subassembly 182, after installation on the landing gear structure, can be achieved by adjusting the position of the rod 186 relative to the L-shaped member 228 on the lower leg to which it is secured by making suitable adjustments of the threaded nuts 226 on the lower end portion 192 of the rod 186.

Figure 6:
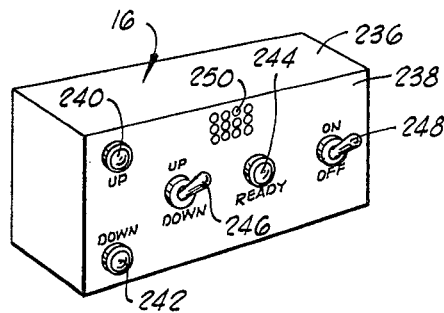
FIG. 6 is an enlarged perspective view of the tractor control unit of the improved automatic landing gear extension and retraction apparatus of the present invention.

The tractor control unit 16 may suitably be housed in its own cabinet 236, as shown in FIG. 6, and installed by suitable means on the dashboard or doghouse within the cab 22 of the tractor 10, as shown in FIG. 1. It will also be understood that the tractor control unit 16 may also be mounted permanently in the dashboard of the tractor 10. In either installation, the tractor control unit 16 preferably includes a control panel 238 which may be readily viewed by an operator in the cab 22. The control panel 238 includes a pair of indicator lights 240 and 242 for indicating, respectively, that the landing gear 44 is in the fully retracted, "up" position or the fully extended, "down" position. The "up" and "down" indicator lights 240 and 242 are preferably red, although other colors of indicator lights may be employed.

A third indicator light 244 is also included that indicates that the toggle switch 246 is in the "on" position and that the landing gear extension and retraction apparatus is activated. The toggle switch 246 provides means within the cab 22 to switch the landing gear extension and retraction apparatus on or off. When the switch 246 is in the "on" position, the indicator light 244 is illuminated and when the switch 246 is in the "off" position the indicator light 244 is extinguished. The color of the indicator light 244 is preferably yellow and is labeled on the control panel "ready".

A second toggle switch 248 is also included on the control panel 238 and provides the operator with means for actuating the landing gear extension and retraction apparatus to either extend or retract the struts 46 and 48. By placing the toggle switch 248 in the "up" position, the struts are retracted, and by placing the switch in the "down" position the struts are extended.

The tractor control unit 16 further preferably includes an audio tone oscillator 250 mounted on and immediately behind the control panel 238. The tone oscillator 250 provides an audible alarm through apertures in the panel 238 when the struts 46 and 48 of the landing gear 44 are between the fully extended and fully retracted positions and whenever the struts are in a fully retracted or fully extended position which does not correspond to the position dictated by the "up/down" toggle switch 248 on the control panel 238.

The cable assembly 20 includes a seven-pin cable connector comprising a connector plug 252 and a connector jack 254. The seven-pin connector permits the cable assembly 20 to be parted when it is desired to park the semi-trailer and remove the tractor therefrom.

FIG. 9 provides an electrical schematic diagram of the components of the landing gear extension and retraction apparatus 14. With regard to the tractor control units 16, it will be seen that one switch terminal of the "up/down" switch 248 is connected via the conductor 34 to the switched terminal of the key-operated switch 30 in the cab 22 of the tractor 10. The common terminal of the switch 24 is electrically connected to pin 1 of the connector jack 254 via the cable assembly 20. The common terminal of a relay 256 is also electrically connected via the conductor 34 of the switched terminal of the key-operated switch 30 in the tractor 10. The "on" terminal of the "on/off" switch 246 is electrically connected via conductor 32 to the electrical power source 26 in the tractor 10 and is also electrically connected to pin 2 of the connector jack 254 via the cable assembly 20. The common terminal of the switch 246 is electrically connected to the pin 3 of the connector jack 254 via the cable assembly 20.

Pin 4 of the connector jack 254 is connected via the cable assembly 20 and a 1.2 K resistor 258 to the anode of a light emitting diode forming the "down" indicator light 242. Pin 4 of the jack 254 is also electrically connected to the anode of a diode 260, the cathode of the diode 260 being electrically connected to one terminal of the operating coil of the relay 256.

Pin 5 of the jack 254 is electrically connected via the cable assembly 20 to ground in the tractor 10. Pin 6 of the connector jack 254 is electrically connected via the cable assembly 20 to the anode of a diode 262, the cathode of the diode 262 being electrically connected to the cathode of the diode 260. Pin 6 of the jack 254 is also electrically connected via a 1.2 K resistor 264 to the anode of a light emitting diode forming the "up" indicator light 240. Pin 7 of the connector jack 254 is electrically connected via the cable assembly 20 and a 1.2 K resistor 266 to the anode of a light emitting diode forming the "ready" indicator light 244. The cathodes of the light emitting diodes 240, 242 and 244 are electrically connected to ground in the tractor 10. Also, the other terminal of the operating coil of the relay 256 is electrically connected to ground in the tractor 10.

The audio tone oscillator 250 has one terminal thereof electrically connected to ground in the tractor 10 and the other terminal thereof connected to the normally closed switch terminal of the relay 256.

With regard to the semi-trailer control and actuating assembly 18, it will be seen that pin 1 of the connector plug 252 is electrically connected to the "remote" switch terminal of the "local/remote" switch 110, while the "down" switch terminal of the "up/down" switch 112 is electrically connected to pin 2 of the connector plug 252. The "local" switch terminal of the switch 110 is electrically connected to the common switch terminal of the switch 112. The common switch terminal of the switch 110 is electrically connected via a suitable fuse 168 to one terminal of the operating coil of a motor control relay 270.

The "power" terminal of the "power/manual" switch 114 is electrically connected via a suitable resettable fuse or breaker 272 to pin 3 of the connector plug 252. The common switch terminal of switch 114 is electrically connected to one normally closed switch terminal associated with one pole of the double pole double throw relay 270 and to the normally open switch terminal associated with the other pole. The common terminals for the two poles of the relay 270 are electrically series connected across the windings of the electric drive motor 130.

One terminal of the normally closed landing gear position indicating switch 216 is electrically connected to a normally closed switch terminal of the relay 270 and is also electrically connected to pin 6 of the connector plug 252. The other terminal of the switch 216 is electrically connected to pin 5 of the connector plug 252. One terminal of the normally open landing gear position indicating switch 220 is electrically connected to a normally open switch terminal of the relay 270 and is also electrically connected to pin 4 of the connector plug 252. The other terminal of switch 220 is electrically connected to pin 5 of the connector plug 252 and to the other terminal of the operating coil of the relay 270. Pin 7 of the connector plug 252 is electrically connected to the common switch terminal of switch 114 as well as the normally closed switch terminal of the upper pole and the normally open switch terminal of the lower pole of the relay 270.

It should be understood at this point that the connector plug 252 is so wired as to permit its connection with the standard seven-pin connector jack utilized in most tractors to connect the electrical system of the semi-trailer to which it is to be hitched to the electrical power source in the tractor. This configuration of the connector jack 252 permits the semi-trailer control and the actuation assembly 18 of the landing gear extension and retraction apparatus 14 to extend and retract the landing gear utilizing the electrical power source of a tractor which does not have a tractor control unit 16 mounted therein.

Operation

The landing gear extension and retraction apparatus 14 is adapted to be operated either from the cab of a tractor or from a control panel on the semi-trailer near the landing gear. In many cases it will be most convenient for the driver to operate the apparatus 14 from the cab 22 of the tractor 10 through the use of the tractor control 16.

To operate the landing gear extension and retraction apparatus 14 from the cab of the tractor 10, the semi-trailer 12 is first parked in the desired position and the hitch pin 36 is released from the fifth wheel high member 24. At this point it is assumed that the struts 46 and 48 of the landing gear 44 are fully retracted and it is desired to fully extend the struts to support the forward end portion 38 of the semi-trailer on the ground free of the fifth wheel hitch member 24.

The switch 246 will initially be in the "off" position and the switch 248 will initially be in the "up" position. On the semi-trailer control actuation assembly 18, the "local/remote" switch 110 is initially in the remote position, the "up/down" switch 112 may be in either position and the "power/manual" switch 114 will initially be in the "power" position. Normally closed position indicating switch 216 will initially be open and normally open position indicating switch 220 will initially be closed.

To extend the struts 46 and 48 in the landing gear 44, the operator initially closes the key-operated switch 30 in the cab 22 thus applying electrical power, typically 24 volts D.C., to the apparatus 14 through electrical conductor 34. The switch 246 is then placed in the "on" position illuminating the ready light 244, and switch 248 is moved to the "down" position. At this instant, neither of the indicator lights 240 and 242 are illuminated, the relay 256 is deenergized and the oscillator 250 is providing an audible signal. Current is directed through switch 248, cable assembly 20, switch 110, fuse 268, the operating coil of the relay 270 and back to ground via the cable assembly 20 to energize the relay 270 and place the switches of the relay in the normally open position as shown in FIG. 9. Current is also directed from the switch 114 through pin 7 of the connector of the cable assembly 20 to the anode of the "ready" light emitting diode via resistor 266, and from the cathode of the "ready" light emitting diode 244 to ground thus illuminating the "ready" light emitting diode. It will be seen that the "ready" light emitting diode will always be illuminated as long as switch 246 is in the "on" position and switch 114 is in the "power" position, and, provided, the fuse 272 remains set. Current is also directed through the switch 246, cable assembly 20, fuse 272 and switch 114 to the windings of the electric drive motor 130 via the normally open terminals of the relay 270. The circuit through the motor 130 is completed from the relay 270 through closed switch 220 back to ground via the cable assembly 20. Current so applied to the electric drive motor 130 rotates the input drive shaft 78 of the landing gear 44 in a first direction to extend the retracted struts 46 and 48.

When the struts are partially extended, the rod 186 is disengaged from the initially open switch 216 which then closes. When the struts 46 and 48 are fully extended, the rod 186 is disengaged from the initially closed switch 220 which then opens. The opening of the switch 220 then applies the current passing through electric drive motor 130 to the anode of the light emitting diode 242 via the cable assembly 20 and the resistor 258, and from the cathode of the "down" light emitting diode 242 to ground thus illuminating the "down" light emitting diode. Current is also applied to the anode of the diode 260 and from the cathode thereof through the operating coil of the relay 256 to ground thereby energizing the relay 256 and opening the circuit to the oscillator 250. The resistance across resistor 258 and across diode 260 and the operating coil of the relay 256 is such that the current flow through the windings of the electric drive motor 130 is so reduced that the drive motor discontinues operation. The illumination of the "down" light emitting diode 242 provides visual indication to the operator in the cab 22 that the struts 46 and 48 of the landing gear 44 have now achieved the fully extended position thereby supporting the forward end portion 38 of the semi-trailer 12 free of the fifth wheel hitch member 24 of the tractor 10. At this point, the operator moves the switch 246 to the "off" position and disconnects the plug 252 from the jack 254 and the tractor can be driven away from the parked semi-trailer.

When it is desired to hitch the semi-trailer to the tractor again, the tractor is appropriately positioned relative to the semi-trailer with the hitch pin 36 adjacent the hitch member and the connector plug 252 is reconnected to the connector jack 254. With the key-operated switch 30 closed, the operator then positions the switch 246 in the "on" position, again illuminating the "ready" light 244. Switch 248 is then positioned in the "up" position which deenergizes relay 270. Under these conditions, electrical power is provided from the tractor 10 through conduit 32 to the upper normally closed switch terminal of relay 270. Current passes through the upper switch pole through the windings of the electrical drive motor 130 and returns through the lower switch pole of relay 270 to the normally closed switch terminal thereof through closed switch 216 and cable assembly 20 to ground. It will be seen that this causes a reversal of the direction of current through the windings of the reversible electric drive motor 130 which causes the drive motor to rotate the input drive shaft of the landing gear 44 in a second direction thereby retracting the extended struts 46 and 48. It will be noted that relay 256 is not energized and electrical power is provided through the switch thereof from electrical conductor 34 through audio oscillator 250 to ground to thereby provide an audio signal indicating operation of the apparatus 14.

When the struts 46 and 48 are partially retracted, the rod 186 engages the lower position indicating switch 220 and closes the switch. When the struts 46 and 48 are fully retracted, the rod 186 engages the upper position indicating switch 216 thereby opening the switch. Current through the windings of the electric drive motor 130 is then directed from the lower normally closed switch terminal of the relay 270 through pin 6 of the cable connector of cable assembly 20 across resistor 264 to the anode of the "up" light emitting diode 240 and from the cathode thereof to ground, thus illiminating the "up" light emitting diode 240 and indicating that the landing gear is in its fully retracted position. Current is also applied to the anode of the diode 262 and from the cathode thereof to the operating coil of the relay 256 thereby energizing relay 256 and breaking the circuit to the audio oscillator 250. A resistance across the resistor 264 and light emitting diode 240 and the resistance across the diode 262 and operating coil of the relay 256 is of such magnitude that the current flow through the windings of the electric drive motor 130 is reduced to the extent that the drive motor discontinues operation.

At this point, the operator moves the switch 246 to the "off" position thereby deactivating the apparatus 14. He then secures the hitch pin 36 in the fifth wheel hitch member 24 of the tractor 10 and is then ready to drive away with the semi-trailer 12 hitched to the tractor 10.

In the event the operator desires to manipulate the landing gear 44 from a position adjacent the landing gear, he need only unlock the key locked mechanism 108 and open the door 106 to gain access to the switch panel 104 of the control subassembly 88. With the semi-trailer 12 connected to the tractor 10 via the cable assembly 20, the operator then positions the switch 110 in the "local" position. If the landing gear is in its fully retracted position, the operator releases the hitch pin 36 from the fifth wheel hitch member 24 and moves the switch 112 to the "down" position. The mechanism of the apparatus 14 then responds in a manner similar to that described above with the exception that the operator exerts control over the apparatus 14 at the semi-trailer. It is necessary, however, that the switch 246 on the tractor control unit 16 be positioned in the "on" position in order for electric power to be applied to the operating coil of the relay 270 and to the windings of the electric drive motor 130.

In the same manner as described above, the struts 46 and 48 will be automatically extended through the action of the electric drive motor 130 until the struts reach their fully extended position at which time the position indicating switch 220 opens and the electric drive motor 130 will be automatically shut off. When the connector jack 254 is then detached from the connector plug 252, the tractor 10 can be driven away from the parked semi-trailer 12.

When it is desired to rehitch the semi-trailer 12 to the tractor 10, the connector plug 252 is reconnected to the connector jack 254 with the hitch pin 36 of the semi-trailer properly positioned relative to the fifth wheel hitch member 24 of the tractor 10. The operator then moves the switch 112 to the "up" position thereby deenergizing the relay 270 and causing current to flow the opposite direction through the windings of the electric drive motor 130 causing rotation of the input drive shaft of the landing gear 144 in the second direction to retract the extended landing gear.

As described previously, when the landing gear is in its fully retracted position, the rod 186 contacts the switch 216 thus opening the switch and directing the current through the resistor 264 and light emitting diode 240 to ground and through the diode 262 and operating coil of the relay 256 to ground. This causes the motor 130 to shut down, as well as illuminating the "up" indicator light 240 and shutting off the audio oscillator 250 in the tractor control unit 16. The hitch pin 36 is then secured to the fifth wheel hitch member 24 and the tractor and semi-trailer are ready to drive away.

It will be readily apparent from the foregoing that the landing gear extension and retraction apparatus 14 of the present invention provides convenient and flexible means for automatically extending and retracting the landing gear of a semi-trailer to facilitate the dropping and picking up of semi-trailers in the trucking industry. A number of safety features are provided by the present invention including visual indication that the apparatus has been actuated and visual indication as to whether the landing gear is fully extended or fully retracted. Also, an audio signal is provided to indicate to the operator that the apparatus 14 is in the process of extending or retracting the landing gear of the semi-trailer. The relay 270 is installed such that when it is deenergized, electric power will be provided to the windings of the electric drive motor 130 to cause retraction of the landing gear 44, and the relay 270 must be energized to cause extension of the landing gear 44. Similarly, the relay 270 is employed in such a manner that the audio oscillator connected thereto is operated when the relay is deenergized and shut off only when the relay is energized. The apparatus 44 is also readily adaptable for installation on existing tractors and semi-trailers as well as being well suited for installation at the time of manufacture of new tractors and semi-trailers.

Changes may be made in the combination and arrangement of parts or elements as heretofore set forth in the specification and shown in the drawings without departing from the spirit and scope of the invention as defined in the following claims.

What is claimed is:

1. In a tractor trailer rig of the type which includes a conventional tractor having an operator's cab, a source of electrical power, and a fifth wheel hitch member; a semi-trailer having hitch pin means on the forward end portion for engaging the fifth wheel hitch member, road wheels journaled on the rear end portion and an alternately extendable and retractable landing gear mounted intermediate the hitch pin means and the road wheels; the landing gear having gear drive means operatively engaged therewith which gear drive means includes an input drive shaft adapted to be engaged by a crank handle for manual rotation thereof in a first direction to extend the landing gear to engage the ground and support the semi-trailer independently of the tractor and, alternately, in a second direction to retract the landing gear from the ground engaging position to allow the forward end portion of the semi-trailer to be supported by the tractor with the hitch pin means engaging the fifth wheel hitch member; an improved automatic landing gear extension and retraction apparatus comprising:

an electric drive motor mounted on the forward end portion of the semi-trailer and having a power output shaft;

means for drivingly connecting the power output shaft to the input drive shaft of the gear drive means of the landing gear;

position sensing means operatively connected to the landing gear for providing a first signal output when the landing gear is retracted and, alternately, for providing a second signal output when the landing gear is extended; and control circuit means mutually interconnecting the source of electrical power, the electric drive motor and the position sensing means, and responsive to external control thereof, for providing electrical power to the electric drive motor to rotate the input drive shaft in the first direction to extend the landing gear and, alternately, for providing electrical power to the electric drive motor to rotate the input drive shaft in the second direction to retract the landing gear.

2. The apparatus as defined in claim 1 wherein said control circuit means is characterized further to include:

switch means for providing, in a first position thereof, electrical power to the electric drive motor to rotate the input drive shaft in the first direction and, alternately, for providing, in a second position thereof, electrical power to the electric drive motor to rotate the input drive shaft in the second direction.

3. The apparatus as defined in claim 2 wherein said switch means is mounted on said semi-trailer.

4. The apparatus as defined in claim 2 wherein said switch means is characterized further to include:

a first switch mounted on said semi-trailer;

a second switch mounted on said tractor; and said first and second switches being electrically interconnected and arranged so as to permit the electrical power provided to the electric drive motor to be switched at the semi-trailer, and at the tractor.

5. The apparatus as defined in claim 1 wherein said control circuit means is characterized further to include:
   a first control circuit mounted on the semi-trailer;
   a second control circuit mounted on the tractor; and
   electrical conduit means for interconnecting the first and second control circuits.

6. The apparatus as defined in claim 5 wherein said first control circuit is characterized further to include:
   first switch means having an input terminal and an output terminal for alternately electrically connecting and disconnecting the input and output terminals thereof in response to external manipulation thereof;
   means conneced to the input terminal of said first switch means for connecting said input terminal to the source of electrical power via said electrical conduit means;
   relay means interconnecting the output terminal of said first switch means and the electric drive motor for providing electrical power therethrough to the electric drive motor to alternately rotate the input drive shaft in the first direction and in the second direction in response to manipulation of said first switch means; and
   position sensing means responsive to the extension and retraction of the landing gear and connected to said relay means for providing a first signal output when the landing gear is fully retracted and a second signal output when the landing gear is fully extended.

7. The apparatus as defined in claim 6 wherein said second control circuit is characterized further to include:
   first indicator means connected via said electrical conduit means to said position sensing means for providing a visual indication in response to the first signal output of said position sensing means when the landing gear is fully retracted.

8. The apparatus as defined in claim 7 wherein said second control circuit is characterized further to include:
   second indicator means connected via said electrical conduit means to said position sensing means for providing a visual indication in response to the second signal output from said position sensing means when the landing gear is fully extended.

9. The apparatus as defined in claim 8 wherein said position sensing means is characterized further as being constructed and arranged for providing a third signal output when the landing gear is in a position other than the fully retracted position and the fully extended position; and wherein said second control circuit is characterized further to include:
   third indicator means connected via said electrical conduit means to said position sensing means for providing an audible indication in response to the third signal output from said position sensing means when the landing gear is in a position other than the fully retracted position or the fully extended position.

10. The apparatus as defined in claim 9 wherein said second control circuit is characterized further to include:
    fourth indicator means connected via said electrical conduit means to said relay means for providing a visual indication when electrical power is applied through said relay means to the electric drive motor.

11. The apparatus as defined in claim 10 wherein said second control circuit is characterized further to include:
    second switch means, having an input terminal and an output terminal, for alternately electrically connecting and disconnecting the input and output terminals thereof in response to external manipulation thereof; and
    means connected to the input terminal of said second switch means for connecting the input terminal thereof to the source of electrical power; and said first control circuit is characterized further to include:
    third switch means, having first and second input terminals and an output terminal, interposed between said relay means and the output terminal of said first switch means, the first input terminal of said third switch means being electrically connected to the output terminal of said first switch means, the output terminal of said third switch means being electrically connected to said relay means, and the second input terminal of said switch means being electrically connected via said electrical conduit means to the output terminal of said second switch means, for connecting said relay means to said first switch means and, alternately, to said second switch means.

12. The apparatus as defined in claim 11 wherein said second control circuit is characterized further as being located within the cab of the tractor.

13. The apparatus as defined in claim 11 wherein said first control circuit is characterized further to include:
    container means mounted on said semi-trailer for housing said first and third switch means; and
    door means on said container means for alternately opening and closing said container means to provide and prevent access to said first and third switch means in said container means.

14. The apparatus as defined in claim 13 wherein said control circuit is characterized further to include:
    lock means operatively engageable between said door means and said container means for selectively locking said door means in a position closing said container means.

15. The apparatus as defined in claim 14 wherein said means for drivingly connecting the power output shaft of the electric drive motor to the input drive shaft of the gear drive means of the landing gear is characterized further to include:
    speed reducer means for rotating the input drive shaft of the gear drive means at a rotational speed less than the rotational speed of the power output shaft of the electric drive motor.

16. The apparatus as defined in claim 15 wherein the electric drive motor is characterized further as being a reversible, direct current motor.

17. The apparatus as defined in claim 15 wherein the electric drive motor is characterized further as being a reversible, fractional horsepower, direct current motor having a power rating of approximately one-twentieth horsepower.

18. The apparatus as defined in claim 1 wherein said control circuit means is characterized further to include:
    means responsive to said position sensing means for substantially shutting off electrical power to the electric drive motor when the landing gear is extended.

19. The apparatus as defined in claim 1 wherein said control circuit means is characterized further to include:
means responsive to said position sensing means substantially shutting off electrical power to the electric drive motor when the landing gear is retracted.

20. The apparatus as defined in claim 1 wherein said control circuit means is characterized further to include:
means responsive to the first signal output of said position sensing means for automatically shutting off electrical power to the electric drive motor when the landing gear is retracted; and
means responsive to the second signal output of said position sensing means for automatically shutting off electrical power to the electric drive motor when the landing gear is extended.

21. An improved automatic landing gear extension and retraction apparatus for use with a tractor having an operator's cab and a source of electrical power, and with a semi-trailer having hitch means on the forward end portion and road wheels journaled on the rear end portion thereof, comprising:
an alternately extendable and retractable landing gear mounted on the forward end portion of the semi-trailer intermediate the hitch means and the road wheels;
a gear drive mechanism operatively engaged with said landing gear and having an input drive shaft constructed and arranged such that rotation thereof in a first direction causes a corresponding extension of the landing gear and, alternately, rotation thereof in a second direction causes retraction of the landing gear;
an electric drive motor mounted on the forward end portion of the semi-trailer and having a power output shaft;
means for drivingly connecting the power output shaft to the input drive shaft of said gear drive mechanism;
position sensing means operatively connected to said landing gear for providing a first signal output when said landing gear is retracted, and alternately, for providing a second signal output when said landing gear is extended; and
control circuit means mutually interconnecting the source of electrical power, said electric drive motor and said position sensing means, and responsive to external control thereof, for providing electrical power to said electric drive motor to rotate the input drive shaft in the first direction to extend said landing gear and, alternately, for providing electrical power to said electric drive motor to rotate the input drive shaft in the second direction to retract said landing gear.

22. The apparatus as defined in claim 21 wherein said control circuitry is characterized further to include:
switch means for providing, in a first position thereof, electrical power to said electric drive motor to rotate the input drive shaft in the first direction and, alternately, for providing, in a second position thereof, electrical power to said electric drive motor to rotate the input drive shaft in the second direction.

23. The apparatus as defined in claim 22 wherein said switch means is mounted on said semi-trailer.

24. The apparatus as defined in claim 22 wherein said switch means is characterized further to include:
a first switch mounted on said semi-trailer;
a second switch mounted on said tractor; and
means electrically connecting said first and second switches for permitting the electrical power provided to said electric drive motor to be switched at the semi-trailer and at the tractor.

25. The apparatus as defined in claim 21 wherein said control circuit means is characterized further to include:
a first control circuit mounted on the semi-trailer;
a second control circuit mounted on the tractor; and
electric conduit means for interconnecting the first and second control circuits.

26. The apparatus as defined in claim 21 wherein said control circuit means is characterized further to include:
means responsive to said position sensing means for discontinuing the operation of said electric drive motor when said landing gear is in a predetermined position.

27. The apparatus as defined in claim 21 wherein said control circuit means is characterized further to include:
means responsive to said position sensing means for substantially shutting off electrical power to said electric drive motor when said landing gear is extended.

28. The apparatus as defined in claim 21 wherein said control circuit means is characterized further to include:
means responsive to said position sensing means for substantially shutting off electrical power to said electric drive motor when said landing gear is retracted.

29. The apparatus as defined in claim 21 wherein said control circuit means is characterized further to include:
means responsive to the first signal output of said position sensing means for automatically discontinuing the operation of said electric motor when said landing gear is retracted; and
means responsive to the second signal output of said position sensing means for automatically discontinuing the operation of said electric drive motor when said landing gear is extended.

* * * * *